United States Patent
Karmel et al.

(10) Patent No.: US 9,672,723 B2
(45) Date of Patent: Jun. 6, 2017

(54) SECURITY SYSTEM FOR A MOTORIZED CYCLE

(71) Applicant: Vuzitech, LLC, San Diego, CA (US)

(72) Inventors: Clayton Karmel, San Diego, CA (US); Vu Nguyen, San Diego, CA (US)

(73) Assignee: Vuzitech LLC, San Diego, CA (US)

( * ) Notice: Subject to any disclaimer, the term of this patent is extended or adjusted under 35 U.S.C. 154(b) by 27 days.

(21) Appl. No.: 14/830,676

(22) Filed: Aug. 19, 2015

(65) Prior Publication Data

US 2016/0063843 A1 Mar. 3, 2016

Related U.S. Application Data

(60) Provisional application No. 62/045,007, filed on Sep. 3, 2014.

(51) Int. Cl.

| | |
|---|---|
| *G08B 21/18* | (2006.01) |
| *H04W 4/00* | (2009.01) |
| *B60R 25/045* | (2013.01) |
| *B62H 5/20* | (2006.01) |
| *G07C 9/00* | (2006.01) |
| *B62H 5/08* | (2006.01) |
| *G08B 7/06* | (2006.01) |
| *B62J 99/00* | (2009.01) |

(52) U.S. Cl.
CPC .......... *G08B 21/182* (2013.01); *B60R 25/045* (2013.01); *B62H 5/08* (2013.01); *B62H 5/20* (2013.01); *G07C 9/00309* (2013.01); *H04W 4/008* (2013.01); *B62J 2099/004* (2013.01); *G07C 2209/63* (2013.01); *G08B 7/06* (2013.01)

(58) Field of Classification Search
CPC ...... G08B 21/182; G08B 7/06; B60R 25/045; B62H 5/20; B62H 5/08; G07C 9/00309; G07C 2209/63; H04W 4/008; B62J 2099/004; B62J 2099/044
USPC ............ 340/686.6, 10.1–10.6, 572.1–572.9, 340/539.1, 426.35, 426.36, 427, 426.13, 340/426.14
See application file for complete search history.

(56) References Cited

U.S. PATENT DOCUMENTS

| | | |
|---|---|---|
| 4,673,914 A | 6/1987 | Lee |
| 2002/0125990 A1* | 9/2002 | Emmei .................. B60R 25/04 340/5.6 |

(Continued)

FOREIGN PATENT DOCUMENTS

WO    WO2004085213    10/2004

OTHER PUBLICATIONS

International Search Report and Written Opinion for PCT Application No. PCT/US2015/045970, mailed on Dec. 29, 2015.

*Primary Examiner* — George Bugg
*Assistant Examiner* — Thang Tran
(74) *Attorney, Agent, or Firm* — Clause Eight IPS; Michael Catania

(57) ABSTRACT

A walk-up security system (20) for a motorized cycle (25) is disclosed herein. The system (20) preferably comprises a motorized cycle (25) comprising a relay (26) and a 3-axis gyrometer (27), and a keyfob (30) paired with the relay (26) of the motorized cycle (25). The keyfob (30) comprises an accelerometer (31). The relay (26) is connected to a interrupting type wire (28) of the motorized cycle (25). Starting of the motorized cycle (25) is disabled when the keyfob (30) is a predetermined distance from the relay (26).

19 Claims, 7 Drawing Sheets

(56) References Cited

U.S. PATENT DOCUMENTS

| | | | |
|---|---|---|---|
| 2006/0187007 A1* | 8/2006 | Konno | B60R 25/24 340/426.15 |
| 2006/0244575 A1* | 11/2006 | Ramirez | B60R 25/00 340/426.35 |
| 2007/0256620 A1* | 11/2007 | Viggiano | B63C 9/0005 114/39.16 |
| 2008/0074243 A1* | 3/2008 | Yoshitake | B60R 25/24 340/425.5 |
| 2013/0150028 A1* | 6/2013 | Akins | H04W 4/02 455/427 |
| 2014/0002237 A1* | 1/2014 | Infante | B60R 25/252 340/5.32 |
| 2015/0116079 A1* | 4/2015 | Mishra | G07C 9/00007 340/5.52 |
| 2016/0023588 A1* | 1/2016 | Peterson | H05B 37/0272 315/77 |

* cited by examiner

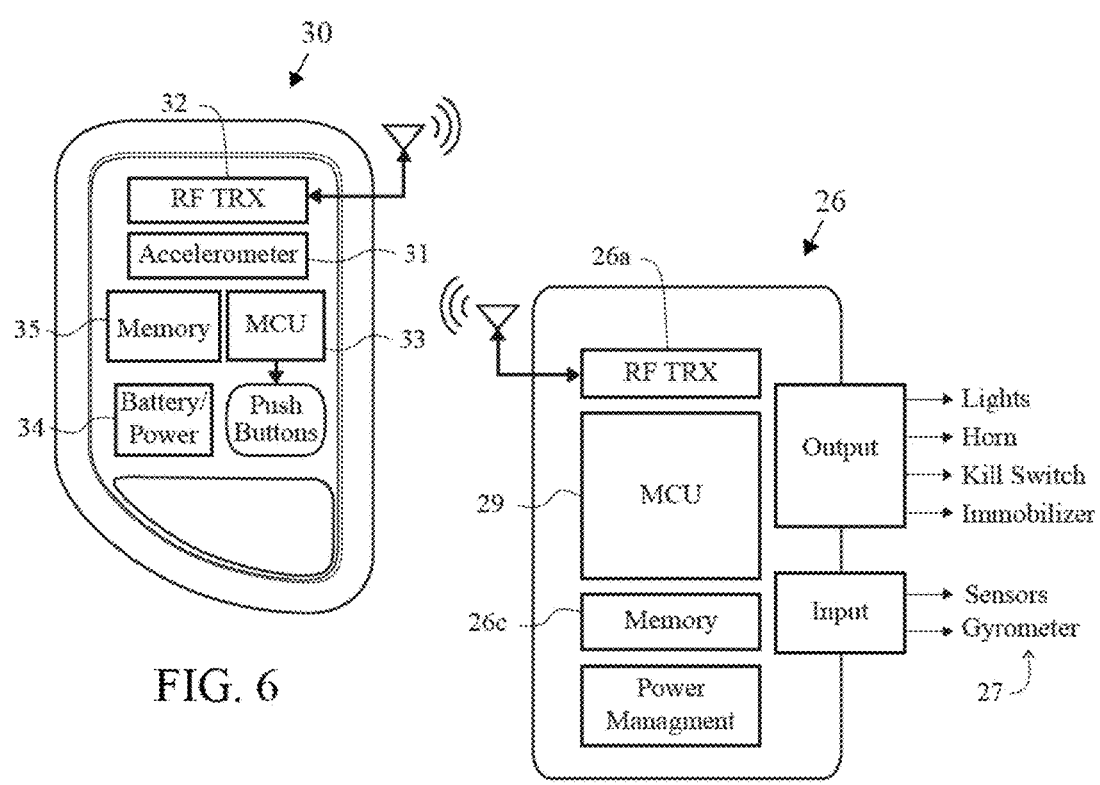

SECURITY SYSTEM FOR A MOTORIZED CYCLE

CROSS REFERENCE TO RELATED APPLICATION

This application claims priority to U.S. Provisional Patent Application No. 62/045,007, filed on Sep. 3, 2014, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to security systems for motorized cycles.

Description of the Related Art

The prior art discusses various walk-up security systems.

In Southeast Asia, it is too common that the operator of a Scooter or Motorcycle (bike) will be knocked off of the bike in order to steal it while it is operation, thus defeating most security systems.

Previously, bike and car alarms detected motion by detecting acceleration operating on a mass. Primitive systems used a metal ball that shorted contacts when it rolled to either end of a tube. Slightly more advanced units used mercury in a glass tube which would short contacts when jostled. Modern versions use 3 axis semiconductor accelerometers. These systems were and are prone to false alarms and require clever algorithms to limit annoying false alarms.

General definitions for terms utilized in the pertinent art are set forth below.

APP is a software application for a mobile phone such as a smart phone.

Beacon is a management frame that contains limited information about a network or device. In a WLAN, Beacon frames are periodically transmitted to announce the presence of the network.

BLUETOOTH technology is a standard short range radio link that operates in the unlicensed 2.4 gigaHertz band.

iBEACON is an BLUETOOTH low energy proximity sensing system from Apple Computer, which enables mobile communication devices to perform actions when in close proximity (a few centimeters, a few meters, or greater than 10 meters as set by the iBEACON) of the iBEACON such as determining a location or receive notifications, and the iBEACON transmits a universally unique identifier, which can be used to location determination.

Internet is the worldwide, decentralized totality of server computers and data-transmission paths which can supply information to a connected and browser-equipped client computer, and can receive and forward information entered from the client computer.

There is a need for a walk-up security system that overcomes the problems of the prior art.

BRIEF SUMMARY OF THE INVENTION

The invention is a walk-up security system for scooters and motorcycles (bikes). Walk-up security systems require no user action to enable or disable starting—simply approaching the bike enables operation, and simply departing disables operation and activates motion alarm sensing.

One aspect of the present invention is a wireless walk-up security system with gyrometer motion detection.

Another aspect of the present invention is a wireless walk-up security system with anti-hijack protection.

Yet another aspect of the present invention is a wireless walk-up security system with pairing of up to 4 keyfob/dongles to 4 bikes using only a button push and a magnet to establish pairing.

Yet another aspect of the present invention is a wireless walk-up security system with integration to conventional 12V IGN wire or solenoid using the same wire, without programming or switches or installer/operator knowledge of the distinction.

Yet another aspect of the present invention is a wireless walk-up security system with ability to drive horn and lights of either or mixed polarity without programming or switches.

Yet another aspect of the present invention is a wireless walk-up security system with ability to interface to both keyfob/dongles and/or to smartphones for enablement or settings or both.

Yet another aspect of the present invention is a wireless walk-up security system with ability to find a lost or stolen bike using LAN/PAN individual wireless resources as a community-shared location service via individual WAN network connections.

Yet another aspect of the present invention is a proximity security system for a motorized cycle. The system preferably comprises a motorized cycle comprising a relay and a 3-axis gyrometer, and a keyfob paired with the relay of the motorized cycle. The keyfob comprises an accelerometer. The relay is connected to an interrupting type wire of the motorized cycle. Starting of the motorized cycle is disabled when the keyfob is a predetermined distance from the relay. Starting of the motorized cycle is enabled when the keyfob is within a predetermined distance of the relay. The accelerometer is configured to detect a violent motion of a rider knocked off of the motorized cycle while in operation and configured to enter an alarm standby state for disablement of the motorized cycle if communication with the keyfob is not received by the relay for a predetermined time period.

The proximity security system for a motorized cycle may comprise multiple keyfobs. Alternatively, the proximity security system for a motorized cycle may comprise multiple motorized cycles and multiple keyfobs.

Alternatively, the proximity security system for a motorized cycle may comprise at least one mobile communication device comprising a mobile application. The mobile application is configured to detect a signal from a relay of a motorized cycle in an alarm mode. The mobile application is configured to transmit the location of the signal from the relay to a central server.

Alternatively, the proximity security system for a motorized cycle may comprise a motorized cycle with integration to conventional 12V ignition wire or solenoid using the same wire, without programming or switches or installer/operator knowledge of the distinction.

Alternatively, the proximity security system for a motorized cycle may comprise a motorized cycle with an ability to drive horn and lights of either or mixed polarity without programming or switches.

Alternatively, the proximity security system for a motorized cycle may comprise a motorized cycle with an ability to interface to both keyfob/dongles and/or to smartphones for enablement or settings or both.

Alternatively, the proximity security system for a motorized cycle may comprise a motorized cycle with an ability to find a lost or stolen bike using LAN/PAN individual wireless resources as a community-shared location service via individual WAN network connections.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 6 is an illustration of the internal components of the keyfob for a motorized cycle security system.

FIG. 7 is an illustration of a relay for a motorized cycle security system.

DETAILED DESCRIPTION OF THE INVENTION

Figure 1:
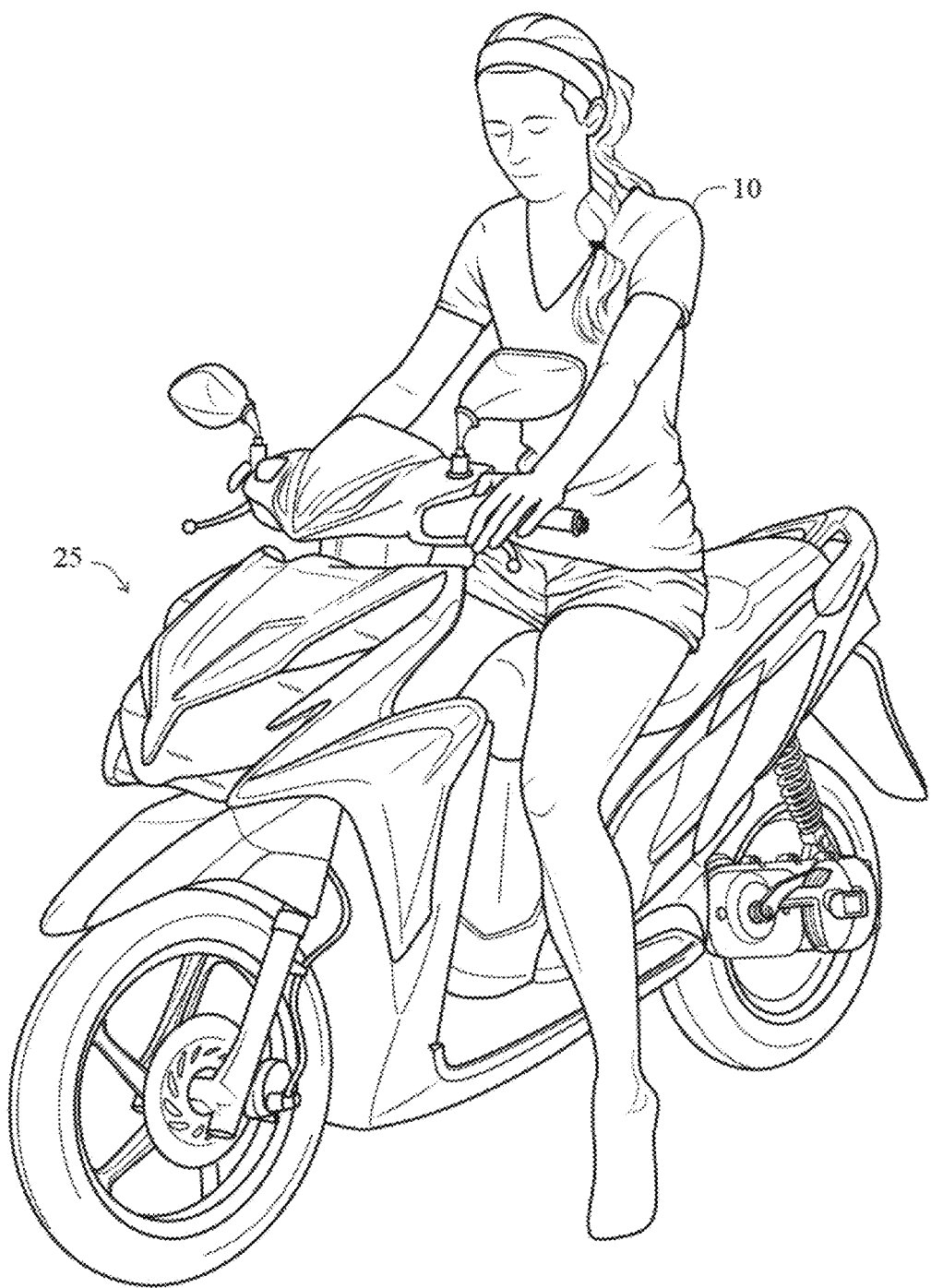
FIG. 1 is an illustration of a women on a motorized cycle having a security system.

As shown in FIGS. 1-7, a proximity security system 20 for a motorized cycle preferably comprises a motorized cycle 25 comprising a relay 26 and a 3-axis gyrometer 27, and a keyfob 30 paired with the relay 26 of the motorized cycle 26. The keyfob 30 comprises an accelerometer 31. The relay 26 is connected to an interrupting type wire 28 of the motorized cycle 25. Starting of the motorized cycle 25 is disabled when the keyfob 30 is a predetermined distance (preferably at least ten meters and alternatively at least three meters) from the relay 26. Starting of the motorized cycle 25 is enabled when the keyfob 30 is within a predetermined distance of the relay 26. The accelerometer 31 is configured to detect a violent motion of a rider 10 knocked off of the motorized cycle 25 while in operation and configured to enter an alarm standby state for disablement of the motorized cycle 25 if communication with the keyfob 30 is not received by the relay 26 for a predetermined time period (preferably at least twenty seconds and alternatively at least thirty seconds).

The motorized cycle 25 is preferably a scooter or a motorcycle. The interrupting type wire 28 is preferably an ignition wire. Alternatively, the interrupting type wire 28 is a solenoid wire. The keyfob 30 is a stand-alone device, or alternatively, a smartphone.

Figure 2:
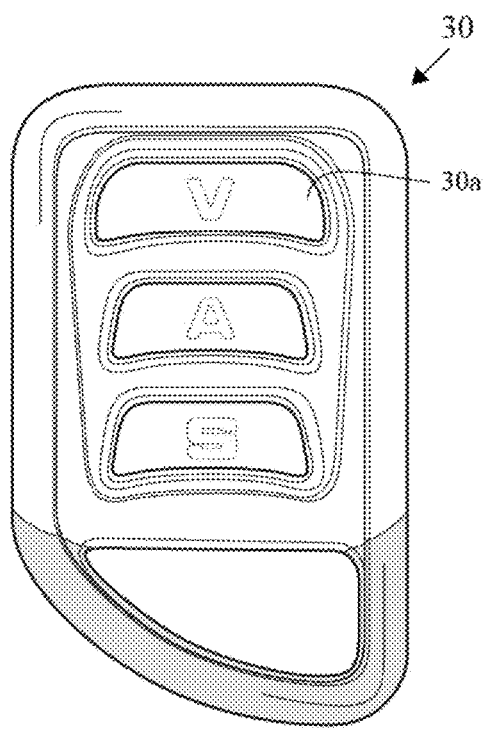
FIG. 2 is a plan view of a keyfob for a motorized cycle security system.
Figure 3:
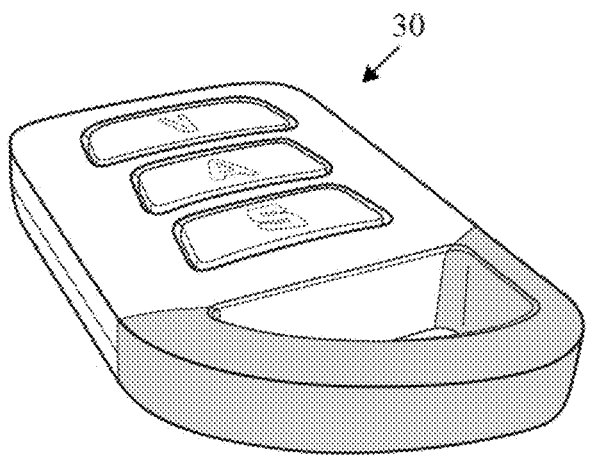
FIG. 3 is a top perspective view of a keyfob for a motorized cycle security system.
Figure 4:
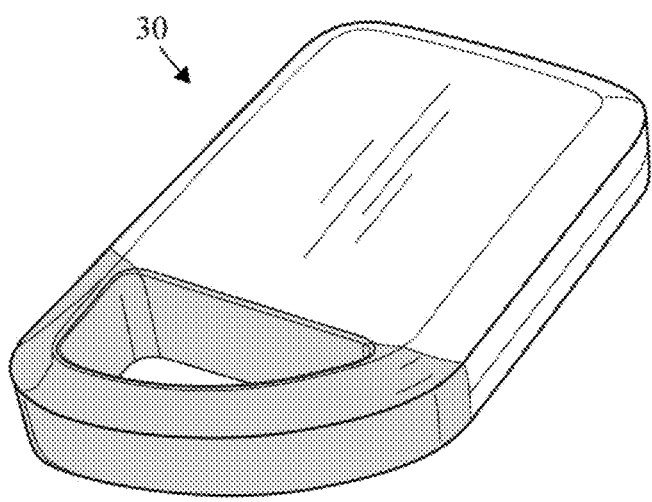
FIG. 4 is a rear perspective view of a keyfob for a motorized cycle security system.
Figure 5:
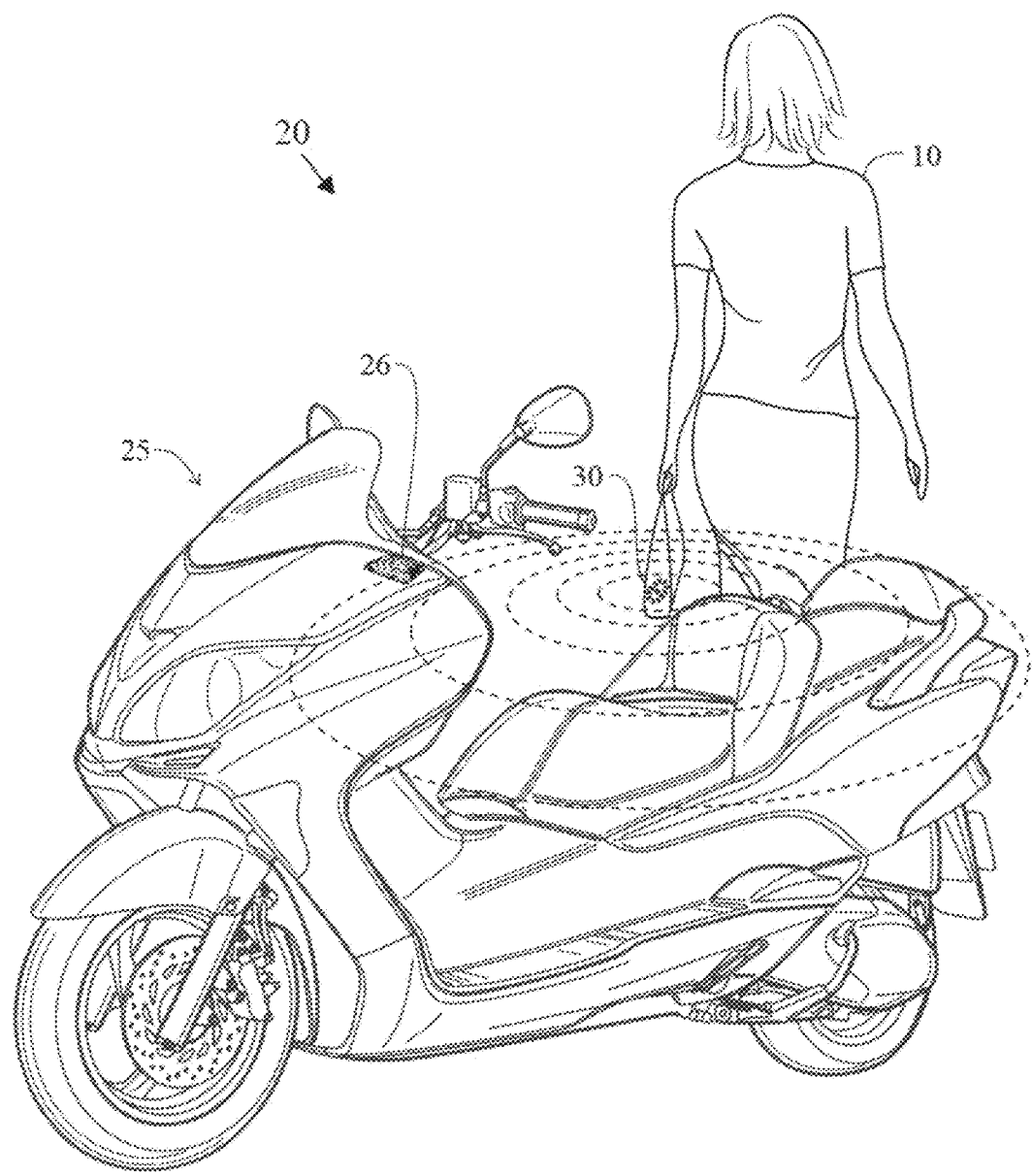
FIG. 5 is an illustration of a scooter that utilizes a motorized cycle security system with a user walking away from the motorized cycle.

As shown in FIG. 2, the keyfob 30 preferably has a valet mode 30a for extending a non-communication time period between the keyfob 30 and the relay 26. The keyfob 30 also preferably has a silent mode (S button) and an alarm mode (A button).

As shown in FIG. 6, the keyfob 30 preferably comprises a transceiver 32, a processor 33, a battery 34, a three-axis accelerometer 31 and a memory 35.

Figure 10:
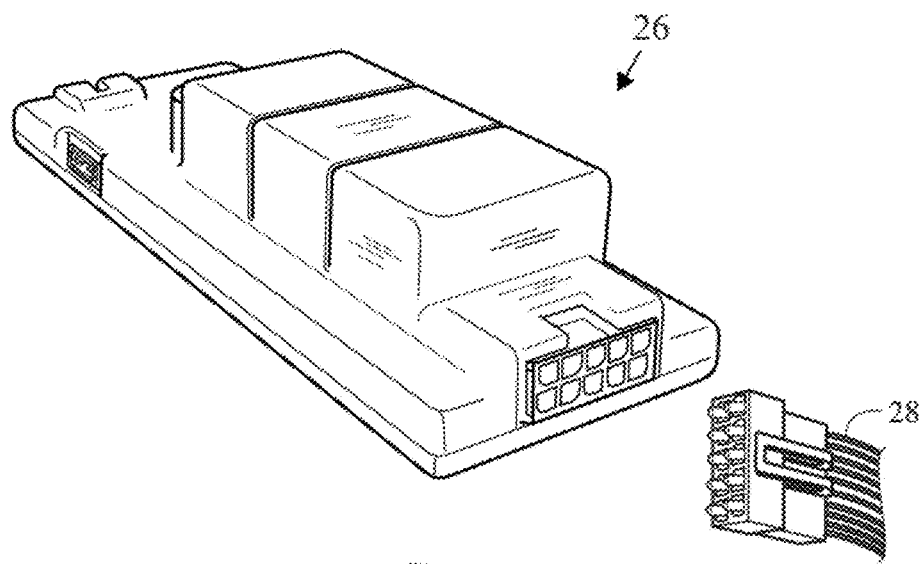
FIG. 10 is an isolated view of a relay and a wire from a motorized cycle for connection to the relay.
Figure 11:
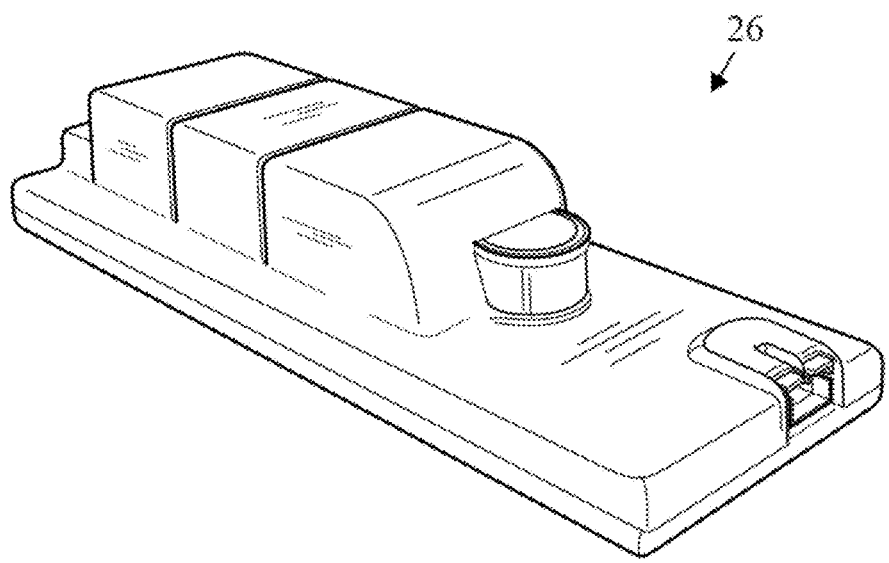
FIG. 11 is an isolated view of a relay.

As shown in FIG. 7, the relay 26 preferably comprises the 3-axis gyrometer 27, a transceiver 26a, a processor 29 and a memory 26c. As shown in FIGS. 10 and 11, the relay 26 is preferably connected to the interrupting wire 28 of the motorized cycle 25.

The keyfob 30 communicates with the relay 26 of the motorized cycle 25 preferably utilizing an ANT, BLUETOOTH or BLUETOOTH LOWENERGY communication format. Those skilled in the pertinent art will recognize that other communication format may be utilized without departing from the scope and spirit of the present invention.

Figure 8:
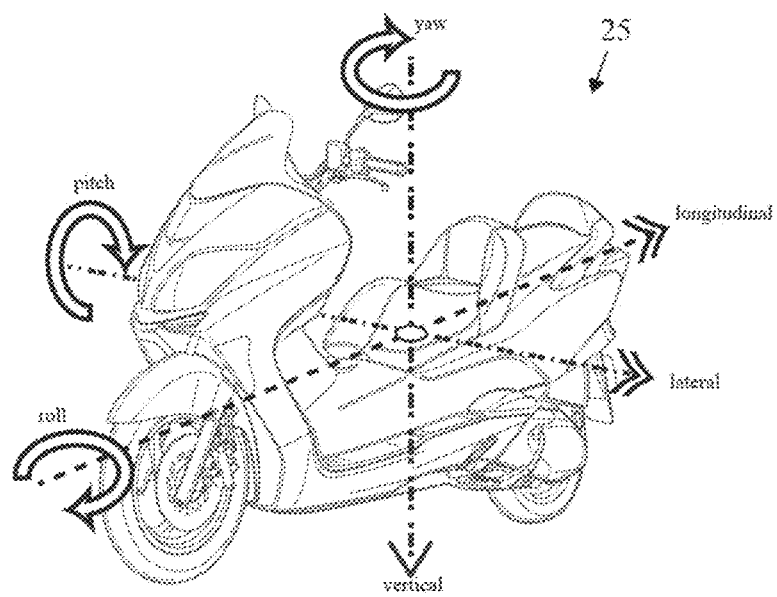
FIG. 8 is an illustration of a scooter that utilizes a motorized cycle security system showing pitch, yaw and roll.
Figure 9:
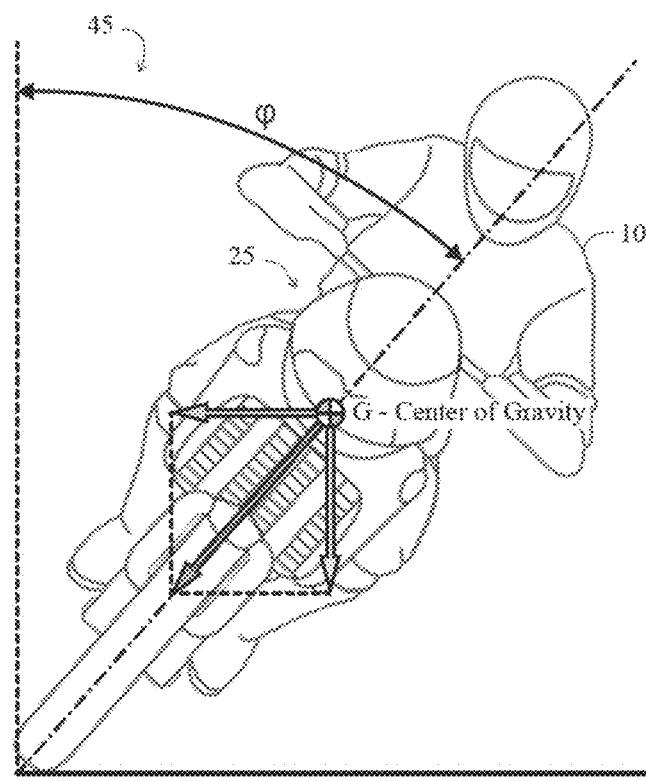
FIG. 9 is an illustration of a rider on a motorized cycle having a security system.
Figure 9A:
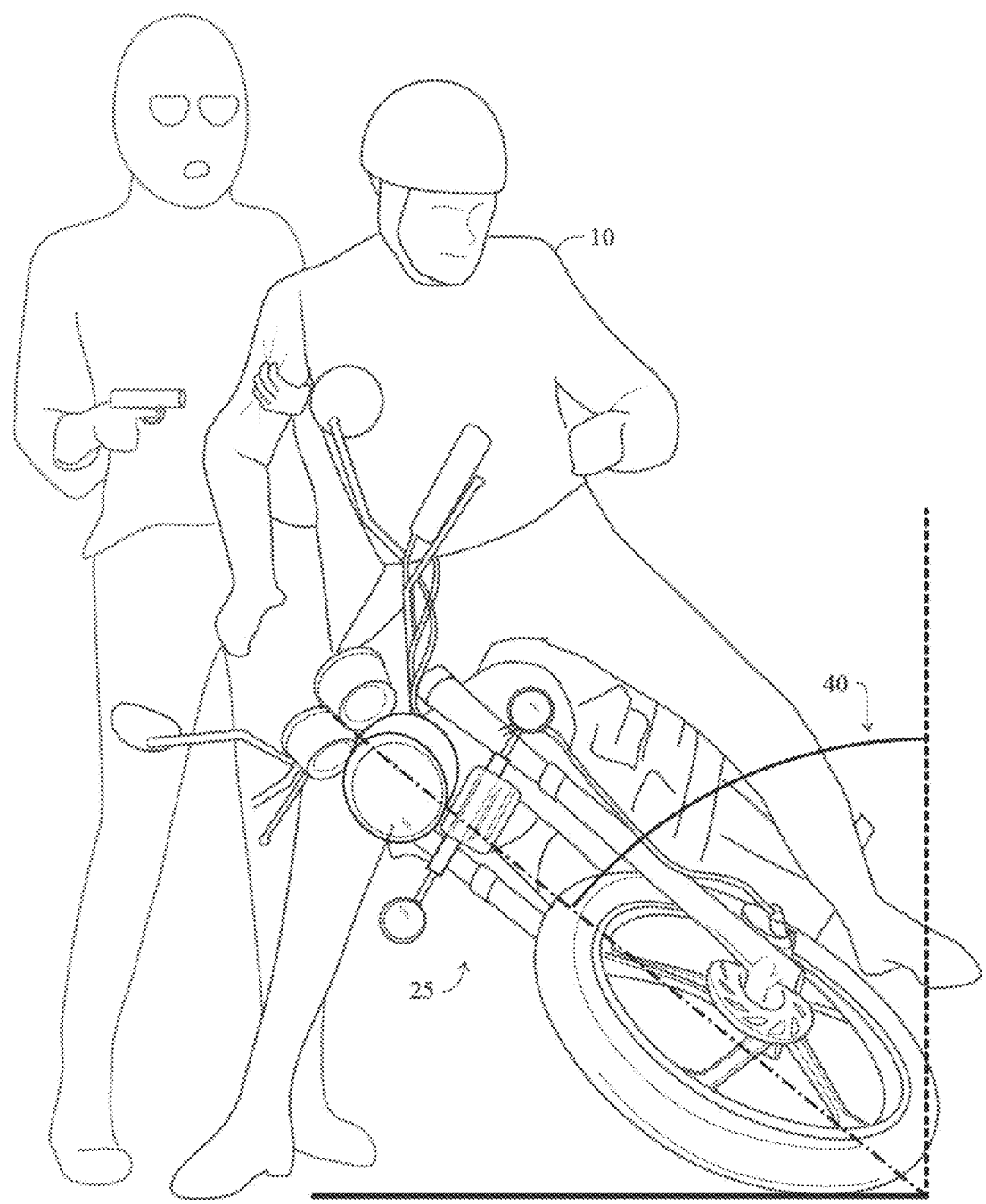
FIG. 9A is an illustration of a rider on a motorized cycle having a security system being robbed of the motorized cycle by a robber.

As shown in FIGS. 8-10, the 3-axis gyrometer 27, in conjunction with a processor 29, is configured to detect the motorized cycle 25 moving slowly through a large arc 40 condition or the motorized cycle 25 moving quickly through a short arc 45 condition.

One embodiment is a walk-up security system 20 for scooters and motorcycles 25. Walk-up security systems 20 preferably require no user action to enable or disable starting—simply approaching the motorized cycle 25 enables operation, and simply departing disables operation and activates motion alarm sensing.

Another embodiment includes a novel anti-hijack provision which disables operation of the motorized cycle 25 if the user 10 is knocked off of it.

Another embodiment includes one or more keyfobs 30 that communicate via wireless signals with a relay 26 installed into the motorized cycle's 25 wiring so that the keyfob 30 can detect operation, inhibit operation, sound horns and flash lights.

Another embodiment includes properties which enhance the utility of the security system 20, including: protecting against forceful hijacking of the motorized cycle 25 while in operation; supporting up to four keyfobs 30 per motorized cycle 25 and up to four motorized cycles 25 per keyfob 30 without programming, via use of a magnet of either North or South polarity; detecting angular motion of the non-operating motorized cycle 25 rather than vibration or tilt to reduce false alarms; detecting operation from either a steady ignition (nominally 12V) signal, or by detection of solenoid pulses, whether positive, negative or both, with a single wire and without programming or re-configuring; supporting either positive-active or negative-active horns and lights without programming; integrated valet and silence functions by pressing a single key (single or double press); integration with smartphones to enable smartphones to act as keyfob 30 substitutes and for setting parameters or controls for the security functions; recovery of lost or stolen motorized cycles 25 via community resources from other users of the system.

As mentioned above, in Southeast Asia, it is too common that the operator of a Scooter or Motorcycle (bike) 25 will be knocked off of the motorized cycle 25 in order to steal it while it is operation, thus defeating most security systems. The system 20 detects the violent motion of the user being knocked off the motorized cycle 25, sending a communication to the motorized cycle 25 to enter an alarm-standby state. If communications with the keyfob 30 are broken within a waiting period (from the violent event) of approximately 30 seconds, the motorized cycle 25 will cease operating. This gives a safe distance for the operator 10 to decide to run towards or away from the stolen motorized cycle 25, and avoids accidentally disabling the motorized cycle 25 during normal operation just because of a severe bump. Sensing of the user's violent motion is preferably implemented using a 3-axis accelerometer that learns orientation and reacts only to substantial and sudden changes in orientation or substantial acceleration or deceleration.

The system 20 preferably uses a pairing mechanism that requires a magnet to be applied to the relay 26 and a special keypress or combination, or special key to a keyfob 30. For a short time, preferably ten seconds, the relay 26 and the keyfob 30 are enabled to automatically pair. This process can be repeated with new keyfobs 30—the relay 26 will preferably retain pairing with the most recently four paired keyfobs 30. Holding a magnet in place on the relay 26 while applying power to the relay 26 preferably clears all prior programming. This enables a user 10 to remove prior-authorization to operate motorized cycle 25 whether that keyfob 30 is available or not (angry ex-girlfriend or ex-boyfriend, for example).

The keyfob 30 similarly accepts pairing with at least four relays 26, thus, for example, a group of four people can share four motorized cycles 25 and each only carry one keyfob 30.

The system 20 preferably uses a 3-axis gyrometer 27 which measures rotational velocity in three-dimensions (rather than linear acceleration). Thus, the motorized cycle 25 must preferably rotate through an angle in a certain amount of time in order to alarm.

Two sets of alarm conditions are set to detect a motorized cycle 25 slowly moving through a large arc or quickly moving through a short arc. The system 20 dramatically reduces the incidence of false alarms caused by routine bumping or jostling of the motorized cycle 25.

The system 20 preferably includes a novel approach for detecting operation and enabling disablement of the motorized cycle 25. Operation is sometimes detected by an ignition signal that might be a steady voltage, often near 12 volts but as low as 6 volts, at times. However, ignition wires are not always available, and opening of the ignition wire may or may not disable operation of the motorized cycle 25. Instead, it may be desirable to monitor the signal to the solenoid of the internal combustion engine of the motorized cycle 25. This signal may range from 0 to 200V, from 0 to −200V, or from −200V to +200V. The system 20 preferably enables installation on any of these types of wires with the same connection to the relay 26. That is, the system 20 preferably includes a clever circuit for monitoring and disabling these widely varying pulses.

In addition to the novel circuit of the system 20 is the novel monitoring and interrupting either type of wire function (ignition or solenoid), thus dramatically simplifying installation. The installer simply needs to find a wire that disables operation when opened, cut it, and connect to either side of the relay kill/detect function.

Motorized cycles 25 vary in how the horn and lights (including head light, tail light, right and left turn signals, brake light) are configured. Some motorized cycles 25 hold both sides of the horn and light at the ignition (battery) voltage, driving one side to ground to activate the horn or light. Others hold both sides at ground, raising one side to the ignition (battery) voltage to activate them. The system 20 provides wiring which enables integration to either type, including motorized cycles 25 that are of mixed type (Horn negative to sound, lights positive to turn on, for example). Implementing two relays driving outputs to 12V or to ground would normally give just one of each type, but the system 20 preferably uses diodes to provide driving/sinking of current for up to six separate lights or horns without activating the others unintentionally.

Additional, the system 20 has a valet mode and a silent mode to limit noise in quiet-zones. The system 20 cleverly implements both functions in a single button. The distinction between them is whether the motorized cycle 25 is operating at the time the function is indicated. If the motorized cycle 25 is operating, the button implements a valet function that lasts until the keyfob 30 is removed from the vicinity of the motorized cycle 25 for some minimum duration (preferably five minutes) and then re-appears. This walk-up valet reset means that a user only ever has to set the valet mode and need take no action to clear it.

The same keyfob button, when the motorized cycle 25 is off, suppresses the walk-up-walk-away indication (brief horn and lights). Similarly, this function may also be self-clearing on the first allowed start-attempt of the motorized cycle 25 after being set. One button, two functions, and both are self-resetting.

The system 20 also may include a smartphones integrated into the security system 20.

The system may include a nearby smartphone equipped with an application that can act as a location and reporting device for a lost or alarmed motorized cycle 25. Using a commonly accepted wireless standard, BLUETOOTH Low Energy/Bluetooth Smart, and using a common format, anyone within range of the relay 26 can detect a motorized cycle 25 that has been reported missing or stolen or that is presently in alarm state.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A proximity security system for a motorized cycle, the system comprising:
   a motorized cycle comprising a relay, an interrupting wire, an ignition, a solenoid, and wherein the relay comprises a 3-axis gyrometer, a transceiver, a processor and a memory;
   a keyfob paired with the relay of the motorized cycle, the keyfob comprising an accelerometer;
   wherein the relay is electrically connected to the interrupting wire of the motorized cycle, and the interrupting wire is electrically connected to the ignition or the solenoid;
   wherein starting of the motorized cycle is disabled when the keyfob is a predetermined distance from the relay;
   wherein starting of the motorized cycle is enabled when the keyfob is within a predetermined distance of the relay;
   wherein the accelerometer of the keyfob is configured to detect a violent motion of a rider knocked off of the motorized cycle while in operation, and the 3-axis gyrometer is configured to detect the motorized cycle moving quickly through a short arc condition, and configured to enter an alarm standby state for disablement of the motorized cycle by terminating voltage through the interrupting wire if communication with the keyfob is not received by the transceiver of the relay for a predetermined time period.

2. The system according to claim 1 wherein the motorized cycle is a scooter or a motorcycle.

3. The system according to claim 1 wherein the keyfob communicates with the relay of the motorized cycle utilizing an ANT, BLUETOOTH or BLUETOOTH LOWENERGY communication format.

4. The system according to claim 1 wherein the 3 axis gyrometer is an 3 axis accelerometer.

5. The system according to claim 1 wherein the keyfob is a smartphone.

6. The system according to claim 1 wherein the 3 axis gyrometer, in conjunction with a processor, is configured to detect the motorized cycle moving slowly through a large arc condition or a the motorized cycle moving quickly through a short arc condition.

7. The system according to claim 1 wherein the keyfob is configured to have a valet mode for extending a non-communication time period between the keyfob and the relay.

8. The system according to claim 1 wherein the system comprises a plurality of relays, each in a motorized cycle, wherein each keyfob comprises a 3-axis accelerometer and each keyfob is paired with a relay of a motorized cycle, and is paired and controls the plurality of relays in the plurality of motorized cycles.

9. The system according to claim 1 wherein the relay is configured to trigger an alarm and lights of the motorized cycle when disabled.

10. The system according to claim 1 wherein the system further comprises a plurality of keyfobs, each of the plurality of keyfobs comprising a 3-axis accelerometer and each paired with the relay of the motorized cycle.

11. The system according to claim 10 wherein each of the plurality of keyfobs communicates with the relay of the motorized cycle utilizing an ANT, BLUETOOTH or BLUETOOTH LOWENERGY communication format.

12. The system according to claim 1 further comprising at least one mobile communication device comprising a mobile application, the mobile application is configured to detect a signal from a relay of a motorized cycle in an alarm mode, the mobile application configured to transmit the location of the signal from the relay to a central server.

13. The system according to claim 12 wherein LAN/PAN individual wireless resources are utilized to find the motorized cycle as a community-shared location service via individual WAN network connections.

14. The system according to claim 12 wherein LAN/PAN individual wireless resources are utilized to track the location and path of the motorized cycle while the relay has authorized operation by keyfob proximity.

15. The system according to claim 14 where the track information or bike location is shared over a WAN network.

16. The system according to claim 14 where LAN/PAN individual wireless resources are used to authorize the Relay to operate by an authority connected by a WAN comprising the Internet.

17. A proximity security system for a motorized cycle, the system comprising:

a plurality of motorized cycles, each of the plurality of motorized cycles comprising a relay, an interrupting wire, an ignition, a solenoid, and wherein the relay comprises a transceiver, a processor, a memory and a 3-axis gyrometer;

a keyfob paired with the relay of each of the plurality of motorized cycles, the keyfob comprising a 3-axis accelerometer;

wherein the relay of each of the plurality of motorized cycles is electrically connected to the interrupting wire of the motorized cycle, and the interrupting wire is electrically connected to the ignition or the solenoid;

wherein each of the plurality of motorized cycles is disabled when the keyfob is a predetermined distance from the relay;

wherein each of the plurality of motorized cycles is enabled when the keyfob is within a predetermined distance of the relay;

wherein the 3-axis accelerometer is configured to detect a violent motion of a rider knocked off of at least one of the plurality of motorized cycles while in operation, and the 3-axis gyrometer is configured to detect of at least one of the plurality of motorized cycles moving quickly through a short arc condition, and configured to enter an alarm standby state for disablement by terminating voltage through the interrupting wire of the at least one motorized cycle if communication with the keyfob is not received by the transceiver of the relay for a predetermined time period.

18. The system according to claim 17 further comprising at least one mobile communication device comprising a mobile application, the mobile application is configured to detect a signal from a relay of a motorized cycle in an alarm mode, the mobile application configured to transmit the location of the signal from the relay to a central server.

19. A proximity security system for a motorized cycle, the system comprising:

a motorized cycle comprising a relay, an interrupting wire, an ignition, a solenoid, and wherein the relay comprises a transceiver, a processor, a memory and a 3-axis gyrometer;

a plurality of keyfobs, each of the plurality of keyfobs comprising a 3-axis accelerometer and each paired with the relay of the motorized cycle;

wherein the relay is electrically connected to the interrupting wire of the motorized cycle, and the interrupting wire is electrically connected to the ignition or the solenoid;

wherein starting of the motorized cycle is only enabled when at least one of the plurality of keyfobs is within a predetermined distance of the relay;

wherein the 3-axis accelerometer is configured to detect a violent motion of a rider knocked off of the motorized cycle while in operation, and the 3-axis gyrometer is configured to detect the motorized cycle moving quickly through a short arc condition, and configured to enter an alarm standby state for disablement of the motorized cycle if communication with at least one of the plurality of keyfobs is not received by the transceiver of the relay for a predetermined time period.

* * * * *